United States Patent [19]

Dirks

[11] 3,711,836

[45] Jan. 16, 1973

[54] CYCLIC DATA HANDLING SYSTEMS

[75] Inventor: Gerhard Dirks, Los Altos Hills, Calif.

[73] Assignee: Dirks Electronics Corporation, Los Altos Hills, Calif.

[22] Filed: Sept. 10, 1970

[21] Appl. No.: 71,182

Related U.S. Application Data

[62] Division of Ser. No. 658,183, Aug. 3, 1967, Pat. No. 3,548,381, which is a division of Ser. No. 300,962, Aug. 9, 1963, Pat. No. 3,343,133.

[52] U.S. Cl. ................................................ 340/172.5
[51] Int. Cl. ................................................ G06f 3/00
[58] Field of Search ...................................... 340/172.5

[56] References Cited

UNITED STATES PATENTS

| | | | |
|---|---|---|---|
| 3,307,151 | 2/1967 | Featherston | 340/172.5 |
| 3,274,559 | 9/1966 | Giroux et al | 340/172.5 |
| 3,444,523 | 5/1969 | Dirks | 340/172.5 |
| 3,102,997 | 9/1963 | Dirks | 340/172.5 |

*Primary Examiner*—Harvey E. Springborn
*Attorney*—Charles E. Townsend, Jr., Donald J. De Geller, Anthony B. Diepenbrock, Albert J. Hillman, Thomas H. Olson, Thomas F. Smegal, Jr., William M. Hynes, Daniel H. Kane, Jr., John L. McGannon, Paul W. Vapnik, Ronald S. Laurie and Stephen S. Townsend

[57] ABSTRACT

Information units are stored in a first sequence in a first cyclic storage unit and are transferred to a processing storage operating in synchronism with said first cyclic storage (i.e., at either the same or an integral multiple rate) under control of a control and processing unit. A key field associated with each information unit is fed to the control and processing unit which then controls transfer from the processing storage to second cyclic storage in such a manner that the information units are arranged in a predetermined sequence in accordance with the key fields of the units. The second cyclic storage unit operates at the same rate as the first cyclic storage unit. Merging may be accomplished by similar transfer from a first and second storage unit to a third and fourth cyclic storage unit.

11 Claims, 1 Drawing Figure

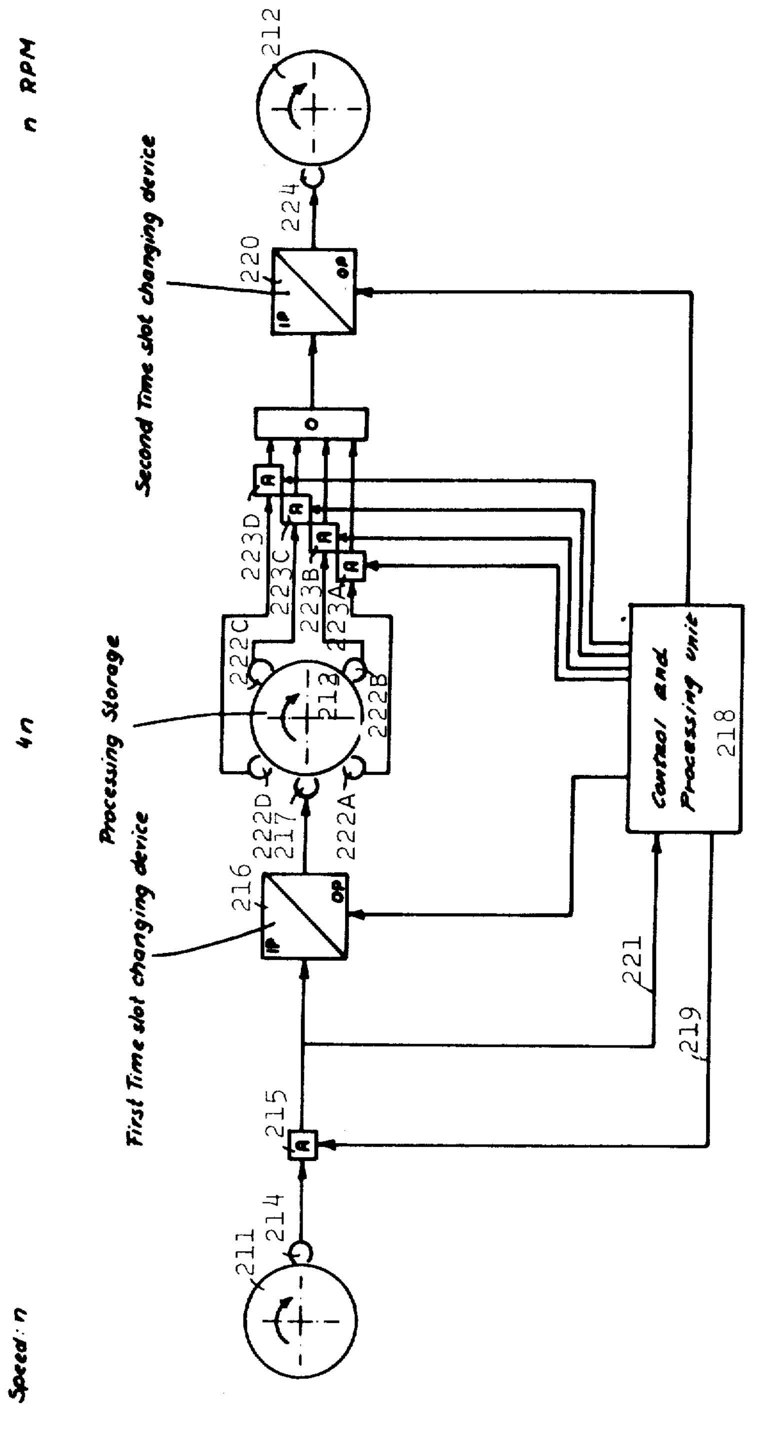
INVENTOR.
GERHARD DIRKS
BY Michael S. Striker
ATTORNEY

CYCLIC DATA HANDLING SYSTEMS

CROSS-REFERENCE TO RELATED APPLICATIONS

The present application is a division of my copending U.S. Pat. application Ser. No. 658,183 entitled "Data Handling Systems," filed Aug. 3, 1967, now U.S. Pat. No. 3,548,381, which application Ser. No. 658,183 is, in turn, a division of my U.S. Pat. application Ser. No. 300,962 entitled "Data Handling System," filed Aug. 9, 1963, now U.S. Pat. No. 3,343,133.

SUMMARY OF THE INVENTION

This invention comprises a cyclic data handling system for handling information units each having a plurality of information elements arranged in a predetermined information element sequence comprising a time-serially readable sequence of bits, said information units each having a key field. It comprises a control and processing unit, and first cyclic storage means storing a plurality of said information units in a first sequence, in such a manner that all of said information units pass a predetermined readout position during a predetermined cycle time, the time interval between successive bits in one information unit constituting a bit time, each of said bit times comprising a plurality of sub-bit time slots.

It further comprises process storage means operating in synchronism with said first cyclic storage means (i.e., having a cycle time related to said predetermined cycle time by an integral ratio). In other words, the cycle time of the processing storage is either equal to the cycle time of the first cyclic storage or is a reciprocal-integer fraction (the inverse of the speed ratio) thereof. The invention also includes second cyclic storage means having a cycle time corresponding to said predetermined cycle time.

Controlled transfer means interconnect said processing storage means and said first and second cyclic storage means and transfer information elements from said first cyclic storage means to said processing storage means and from said processing storage means to said second cyclic storage means under control of said control and process unit.

Finally, time slot changing means are connected with said controlled transfer means for changing the time slots of information elements of said information units stored in said first cyclic storage means under control of said control and processing unit and in dependence on said key field, in such a manner that said information units are stored in said second cyclic storage means in a rearranged sequence corresponding to a predetermined key field sequence.

INCORPORATION OF REFERENCE PATENT

Applicant hereby incorporates into this application the complete specification and drawings including FIGS. 1 to 172 of U.S. Pat. No. 3,343,133, with special reference to the text starting with column 49, line 27 of said patent and continuing to column 53, line 3. Special reference is also made to FIGS. 19*a*, 19*b*, 20, 21, 22 and 23 of said patent.

BRIEF DESCRIPTION OF THE DRAWING

U. S. Pat. No. 3,343,133, which has been incorporated herein comprises a brief description of each of FIGS. 1–172 comprised therein.

The FIGURE is a schematic block diagram of a cyclically operating data handling system having a processing storage revolving at 4 times the rate of the input and output storages and corresponds to FIG. 20 in said incorporated patent.

DESCRIPTION OF THE PREFERRED EMBODIMENT

The preferred embodiment of the present invention which is illustrated in the FIGURE operates as follows. In the embodiment shown data is stored in the first and second storages 211 and 212 in a non-interlaced manner. The processing storage 213 has a speed and bit rate 4 times higher than the first and second storages 211 and 212. Thus, if the first and second storages 211 and 212 contain 16 information units, these information units may be stored on the processing storage 213 in a manner such that four information units are stored around the track each one 4 times interlaced.

The transfer of information units from the non-interlaced first storage 211 to the interlaced processing storage 213 is through a sensing unit 214, AND gate 215, first time slot changing device 216 and a recording unit 217. The first time slot changing device 216 comprises a bit storage which transfers the information units at the bit rate of the first storage 211 into the corresponding sub-bit time slot of the processing storage 213 under the direction of a control and processing unit 218. The AND gate 215 is opened during this time by a signal in line 219 from the control and processing unit 218. Specific parts of the information units used in the control and processing unit 218 for identifying the information units are fed to said control and processing unit via line 221. The processing storage 213 has four sensing units 222a to 222d. Each of the sensing units 222a to 222d is connected to a corresponding one of AND gates 223a to 223d which are controlled by the control and processing unit 218. The output lines of the AND gates 223a to 223d are combined and feed selected information units to the recording units 224 of the second storage 212.

What I claim is:

1. Cyclic data handling system, for handling information units each having a plurality of information elements arranged in a predetermined information element sequence comprising a time-serially readable sequence of bits, said information units each having a key field, said system comprising, in combination, a control and processing unit: first cyclic storage means storing a plurality of said information units in a first sequence, in such a manner that all of said information units pass a predetermined read-out position during a predetermined cycle time, the time interval between successive bits in one information unit constituting a bit time, each of said bit times comprising a plurality of sub-bit time slots; processing storage means having a cycle time related to said predetermined cycle time by an integral ratio; second cyclic storage means having a cycle time corresponding to said predetermined cycle time; controlled transfer means interconnecting said processing storage means and said first and second cyclic storage means for synchronous transfer of information elements from said first cyclic storage means to said processing storage means and from said processing storage means to said second cyclic storage means under control of said control and processing unit; and time slot changing means connected with said controlled transfer means for changing the time slots of information elements of said information units stored in said first cyclic storage means under control of said control and processing unit and in dependence on said key fields, in such a manner that said information units are stored in said second cyclic storage means in a rearranged sequence corresponding to a predetermined key field sequence.

2. A cyclic data handling system as set forth in claim 1 wherein said information elements are bits and wherein the time interval between successive bits in one information unit constitutes a bit time, each of said bit times being further subdivided into a plurality of sub-bit time slots, and wherein said information units are stored interlaced in said first and second cyclic storage means in such a manner that all bits of one information unit occupy corresponding sub-bit time slots within each bit time and the sub-bit time slots of a single bit time contain corresponding bits of different information units arranged in said first sequence in said first cyclic storage means and in said rearranged sequence in said second cyclic storage means.

3. A cyclic data handling system as set forth in claim 2, wherein said time slot changing means is connected between said processing storage means and said second cyclic storage means, whereby said information units are stored in said first cyclic storage means and said processing storage means in said first sequence, and are stored in said second cyclic storage means in said rearranged sequence.

4. A cyclic data handling system as set forth in claim 2, wherein said time slot changing means is connected between said first cyclic storage means and said processing storage means, whereby said information units are stored in said first sequence in said first cyclic storage means and in said rearranged sequence in said processing storage means and said second cyclic storage means.

5. A cyclic data handling system as set forth in claim 1, wherein said time slot changing means comprise first time slot changing means connected between said first cyclic storage means and said processing storage means, and second time slot changing means connected between said processing storage means and said second cyclic storage means; further comprising a plurality of sensing means operatively associated with said processing storage means; wherein said controlled transfer means comprise a plurality of gating means, one connected to each of said sensing means, each under control of said control and processing unit; wherein the cycle time of said processing storage means is a fraction of said predetermined cycle time corresponding to the plurality of said sensing means; and wherein the cycle time of said second cyclic storage means is equal to said predetermined cycle time.

6. A cyclic data handling system as set forth in claim 5, wherein said information units are stored in said first and second cyclic storage means in a non-interlaced manner.

7. A cyclic data handling system as set forth in claim 1, wherein said first cyclic storage means comprise a first and second cyclic storage unit; wherein said second cyclic storage means comprise a third and fourth cyclic storage unit, said information units being stored in said first and second cyclic storage units in a first and second key field sequence respectively; wherein said first and second cyclic storage means have a cycle time equal to said predetermined cycle time; wherein said controlled transfer means comprise first controlled transfer means connected between said first cyclic storage unit and said processing storage means, second controlled transfer means connected between said processing storage means and said third and fourth cyclic storage units, and third controlled transfer means connected between said second cyclic storage unit and said processing storage means; wherein said time slot changing means comprise first time slot changing means connected to said first controlled transfer means, second time slot changing means connected to said second controlled transfer means and third time slot changing means connected to said third controlled transfer means; and wherein said processing storage means has a cycle time equal to a fraction of said predetermined cycle time.

8. A cyclic data handling system as set forth in claim 7, wherein said information units are stored in said first, second, third and fourth cyclic storage units in a non-interlaced manner and in said processing storage means in an interlaced manner.

9. A cyclic data handling system as set forth in claim 8, wherein said second time slot changing means comprise a second time slot changing unit connected between said processing storage means and said third cyclic storage unit, and a fourth time slot changing unit connected between said processing storage means and said fourth cyclic storage unit; further comprising a plurality of sensing units operatively associated with said processing storage means; and a corresponding plurality of gating means, each connected to the corresponding sensing unit, all under control of said control and processing unit.

10. A cyclic data handling system, for handling information units each having a plurality of information elements, said elements being arranged in a predetermined information element sequence, said information units each having associated therewith a key field, said system comprising, in combination:

a control and processing unit;

first cyclic storage unit storing a plurality of said information units in a first sequence, in such a manner that all of said information units pass a predetermined read-out position during a predetermined cycle time, the time interval between successive information elements in one information unit being subdivided into time slots;

second cyclic storage unit storing a plurality of said information units in a second sequence, said second cyclic storage unit having the same cycle time as said first cyclic storage unit;

a third cyclic storage unit;

a fourth cyclic storage unit, said third and fourth cyclic storage units having a cycle time equal to said predetermined cycle time;

processing storage means having a cycle time related to said predetermined cycle time by an integral ratio; and controlled transfer means interconnecting said processing storage means and said first and second cyclic storage units, and said processing storage means and said third and fourth cyclic storage units, said controlled transfer means operating under control of said control and processing unit in such a manner that information units are transferred from said first cyclic storage unit to said processing storage means, from said second cyclic storage unit to said processing storage means, and from said processing storage means to said third and fourth cyclic storage units in dependence upon said key field, thereby storing information elements in said third and fourth cyclic storage units in a re-arranged sequence corresponding to a merging of said first and second sequence.

11. A cyclic data handling system, for handling information units each having a plurality of information elements arranged in a predetermined information element sequence comprising a time-serially readable seqence of bits, said information units each having a key field, said system comprising, in combination, a control and processing unit; first cyclic storage unit storing a plurality of said information units in a first sequence, in such a manner that all of said information units pass a predetermined read-out position during a predetermined cycle time, the time interval between successive bits in one information unit constituting a bit time, each of said bit times comprising a plurality of sub-bit time slots; second cyclic storage unit storing a plurality of said information units in a second sequence, said second cyclic storage unit having the same cycle time as said first cyclic storage unit; a third cyclic storage unit; a fourth cyclic storage unit, said third and fourth cyclic storage units having a cycle time equal to said predetermined cycle time; processing storage means having a cycle time related to said predetermined cycle time by an integral ratio; and controlled transfer means interconnecting said processing storage means and said first and second cyclic storage units, and said processing storage means and said third and fourth cyclic storage units, said controlled transfer means operating under control of said control and processing unit in such a manner that information units are transferred from said first cyclic storage unit to said processing storage means, from said second cyclic storage unit to said processing storage means, and from said processing storage means to said third and fourth cyclic storage units in dependence upon said key field, thereby storing information elements in said third and fourth cyclic storage units in a rearranged sequence corresponding to a merging of said first and second sequence.

* * * * *